(12) United States Patent
Lalancette et al.

(10) Patent No.: US 10,418,792 B2
(45) Date of Patent: Sep. 17, 2019

(54) ELECTRIC LOAD CENTER

(71) Applicant: ABB Schweiz AG, Baden (CH)

(72) Inventors: Daniel Lalancette,
Saint-Jean-sur-Richelieu (CA);
Jean-Michel Pelletier, Lacolle (CA);
Maxime Lefort, Longueuil (CA)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/854,185

(22) Filed: Dec. 26, 2017

(65) Prior Publication Data
US 2018/0198263 A1 Jul. 12, 2018

Related U.S. Application Data

(63) Continuation of application No. 15/402,337, filed on Jan. 10, 2017, now Pat. No. 9,859,692.

(51) Int. Cl.
| | |
|---|---|
| *H02B 1/20* | (2006.01) |
| *H02B 1/44* | (2006.01) |
| *H02B 1/24* | (2006.01) |
| *H02B 1/06* | (2006.01) |
| *H02B 1/056* | (2006.01) |

(52) U.S. Cl.
CPC ............. *H02B 1/44* (2013.01); *H02B 1/056* (2013.01); *H02B 1/06* (2013.01); *H02B 1/20* (2013.01); *H02B 1/24* (2013.01)

(58) Field of Classification Search
CPC . H02B 1/44; H02B 1/056; H02B 1/20; H02B 1/24; H02B 1/06
See application file for complete search history.

(56) References Cited

U.S. PATENT DOCUMENTS

| | | | |
|---|---|---|---|
| 2,902,632 | A | 9/1959 | Stanback et al. |
| 3,694,701 | A | 9/1972 | Stanback |
| 3,818,282 | A | 6/1974 | Buxton et al. |
| 4,790,579 | A | 12/1988 | Maxwell et al. |
| 4,865,368 | A | 9/1989 | McCall et al. |
| 4,909,551 | A | 3/1990 | Buchanan |
| 4,974,740 | A | 12/1990 | Niles et al. |
| 5,053,919 | A | 10/1991 | Schacht |
| 5,062,671 | A | 11/1991 | Goetz et al. |

(Continued)

*Primary Examiner* — Anthony M Haughton
*Assistant Examiner* — Yahya Ahmad
(74) *Attorney, Agent, or Firm* — Taft Stettinius & Hollister LLP; J. Bruce Schelkopf

(57) ABSTRACT

An electrical load center for residential and commercial buildings includes an enclosure, a cover assembly, and a panelboard. The panelboard includes an insulated base, first and second bus bars, each of the first and second bus bars having an elongated main member, a plurality of connecting members, each of which is integrally formed from an edge of the main member, and a plurality of conducting members integrally formed from each of the connecting members. The panelboard further includes at least one neutral bar. The neutral bar is preferably I-shaped and includes a generally vertical main body, and transverse upper and lower members. The transverse upper member is preferably thicker than the transverse lower member and includes an outward taper from a top surface to a bottom of the transverse upper member to provide a greater contact surface area.

14 Claims, 19 Drawing Sheets

(56) References Cited

U.S. PATENT DOCUMENTS

| | | | | |
|---|---|---|---|---|
| 5,081,560 A | * | 1/1992 | Donnerstag | H02B 1/40 361/627 |
| 5,179,491 A | | 1/1993 | Runyan | |
| 5,450,282 A | | 9/1995 | Webber et al. | |
| 5,482,333 A | | 1/1996 | Gehrs et al. | |
| 5,628,534 A | | 5/1997 | Morgan | |
| 5,761,026 A | | 6/1998 | Robinson et al. | |
| 5,835,341 A | * | 11/1998 | Rhodes | H02B 1/056 361/637 |
| 6,050,618 A | | 4/2000 | Tieu | |
| 6,266,232 B1 | * | 7/2001 | Rose | H02B 1/056 248/222.11 |
| 6,459,570 B1 | * | 10/2002 | Buchanan | H01R 9/223 174/166 R |
| 6,722,713 B2 | | 4/2004 | Straka, Jr. | |
| 7,140,650 B2 | | 11/2006 | Berg | |
| 7,403,373 B2 | | 7/2008 | McCoy et al. | |
| 7,417,849 B2 | | 8/2008 | Dixon et al. | |
| 7,508,653 B2 | | 3/2009 | Parlee | |
| 7,772,723 B1 | * | 8/2010 | Flegel | H02B 1/056 307/125 |
| 7,957,122 B2 | | 6/2011 | Sharp | |
| 8,505,986 B2 | | 8/2013 | Sun | |
| 8,693,169 B2 | | 4/2014 | Diaz et al. | |
| 8,901,416 B2 | | 12/2014 | Bornhorst et al. | |
| 8,908,355 B2 | | 12/2014 | Martin et al. | |
| 8,913,354 B2 | | 12/2014 | Van Fossen et al. | |
| 8,929,055 B2 | * | 1/2015 | Potratz | H02B 1/056 174/149 B |
| 8,953,306 B2 | | 2/2015 | Wheeler et al. | |
| 9,007,745 B1 | | 4/2015 | Flegel | |
| 9,203,231 B2 | | 12/2015 | Samuelson et al. | |
| 9,859,692 B1 | * | 1/2018 | Lalancette | H02B 1/44 |
| 2008/0003850 A1 | | 1/2008 | Self et al. | |
| 2008/0158787 A1 | | 7/2008 | Parlee | |
| 2012/0200986 A1 | | 8/2012 | Maloney et al. | |
| 2014/0165390 A1 | * | 6/2014 | Potratz | H01R 9/2458 29/825 |
| 2015/0177288 A1 | | 6/2015 | Foerster | |
| 2015/0380842 A1 | * | 12/2015 | Pearson | H02B 1/056 361/624 |
| 2017/0025830 A1 | * | 1/2017 | Cordova Diaz | H02B 1/041 |
| 2018/0278030 A1 | * | 9/2018 | Benson | H02B 1/30 |

\* cited by examiner

ELECTRIC LOAD CENTER

CROSS-REFERENCE TO RELATED APPLICATION

This application is a continuation of U.S. application Ser. No. 15/402,337 filed Jan. 10, 2017, the entire contents of which is incorporated by reference herein.

FIELD OF THE INVENTION

The present invention relates to electric load centers, and more particularly, to an improved electric load center and its components.

BACKGROUND

Residential and commercial buildings typically have an electric load center to provide electrical circuit control and overcurrent protection. Generally, the electric load centers currently available in the market include an enclosure, a panelboard installed within the enclosure, and a cover assembly configured to cover the enclosure. In the electric load center of the present invention, the panelboard is constructed to optimize power distribution to various branch circuits for lighting, electrical outlets, etc. Specifically, the bus bars mounted onto the panelboard are constructed to optimize current carrying capacity while engaging with the circuit breakers. Additionally, in the present invention, the neural bars included in the panelboard are designed and configured to allow the circuit breakers to be easily plugged onto or pulled off from the neutral bars.

SUMMARY

According to an embodiment of the present invention, an electrical load center includes an enclosure having an open front, a cover configured to be placed over the open front of the enclosure, and a panelboard adapted to be installed within the enclosure. The panelboard includes an insulated base having front and rear surfaces, first and second bus bars, each of the first and second bus bars having an elongated main member extending between top and bottom opposing ends, a plurality of connecting members, each of which is integrally formed from an edge of the main member, and a plurality of conducting members integrally formed from a bottom edge of each of the connecting members, and at least one neutral bar, the at least one neutral bar having a generally vertical main body having first and second ends, and transverse upper and lower members integrally connected and separated by the main body, wherein the transverse upper member is thicker than the transverse lower member, and wherein the upper transverse member of the neutral bar includes an outward taper from a top surface of the transverse upper member to a bottom surface of the transverse upper member.

These and other aspects of the present invention will be better understood in view of the drawings and following detailed description.

DETAILED DESCRIPTION

Figure 1:
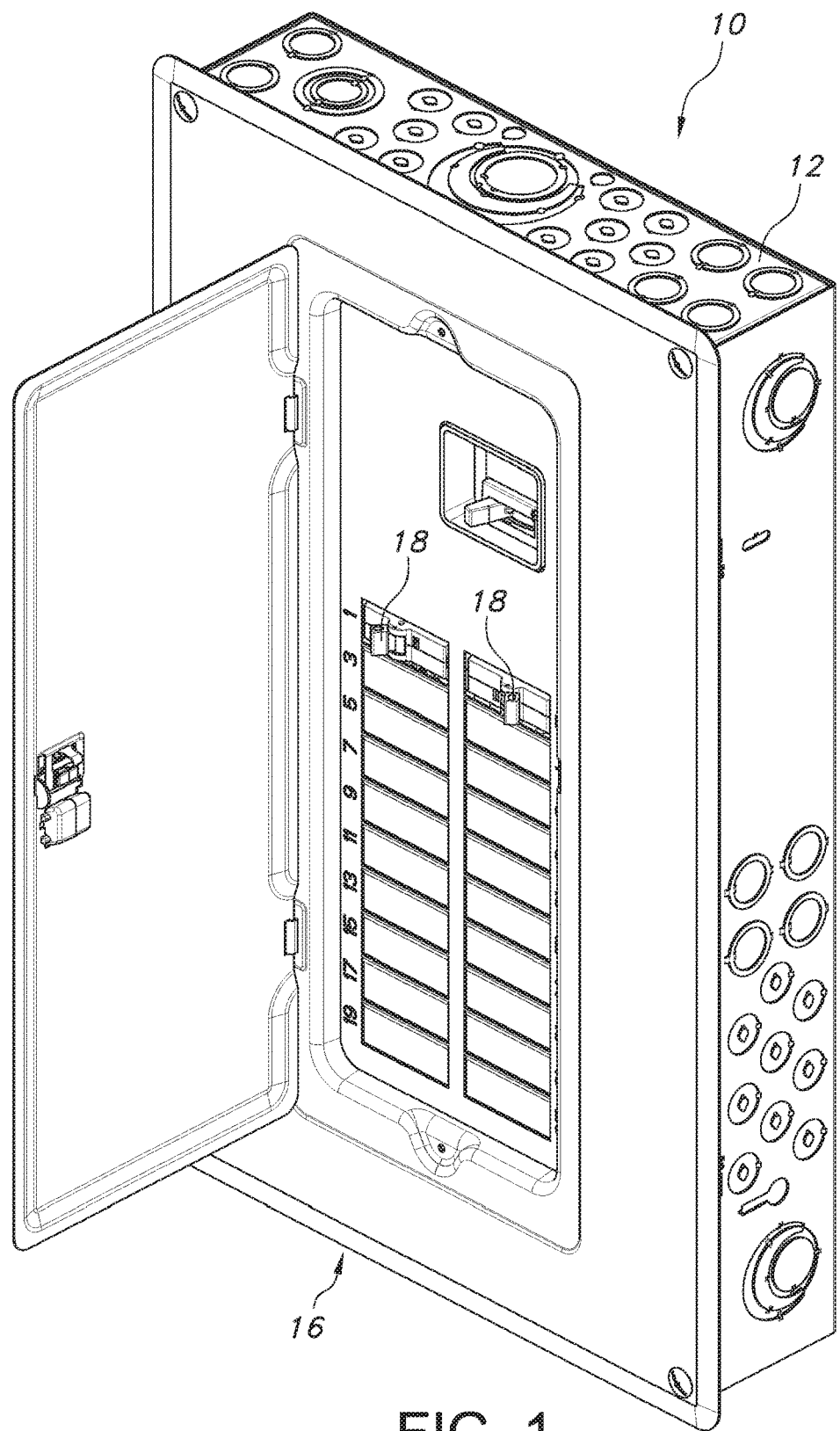
FIG. 1 is a perspective view of an electric load center, according to an embodiment of the present invention.
Figure 2:
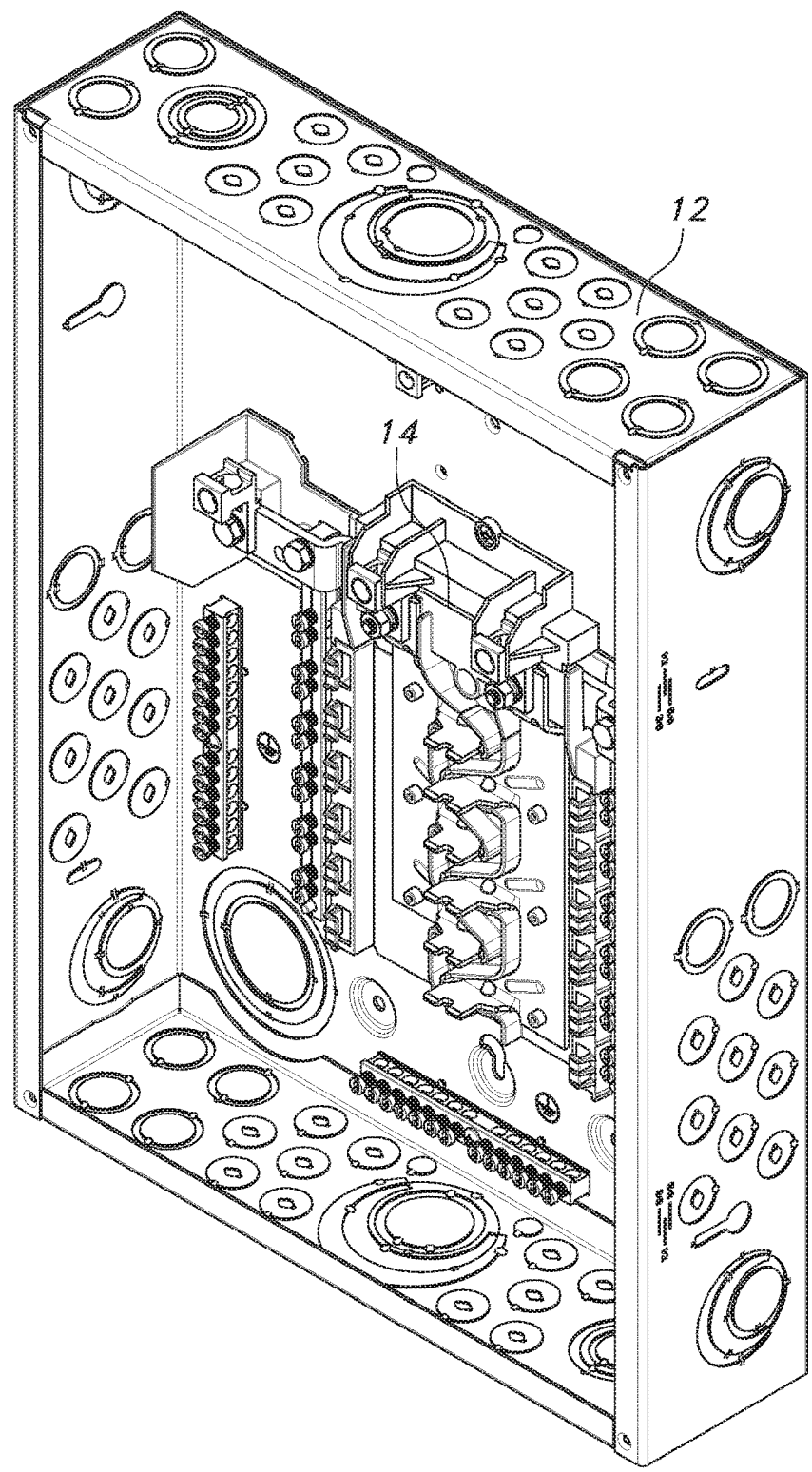
FIG. 2 is a perspective view of the enclosure of the electric load center in FIG. 1, with the panelboard having main lugs installed therewithin.

According to an embodiment of the present invention, referring to FIGS. 1 and 2, there is shown an electric load center 10 adapted to distribute power to various branches (lighting, electrical outlets, etc.). The electric load center 10 includes an enclosure 12, a panelboard 14 designed and configured to be installed within the enclosure 12, and a cover assembly 16 configured to cover the enclosure 12 to provide protection for various interior components installed therewithin. In addition, the cover assembly 16 is constructed to provide access to circuit breakers 18 that are mounted onto the panelboard 14. The circuit breakers 18 provide electrical circuit control and overcurrent protection for residential and commercial buildings if certain undesirable electrical conditions occur.

Directional terms, such as top, bottom, side, and back are referenced to an orientation in which the load center 10 is mounted on a wall such that the cover assembly 16 faces forwards. However, the present invention is not thereby limited to use in any particular orientation.

Figure 3:
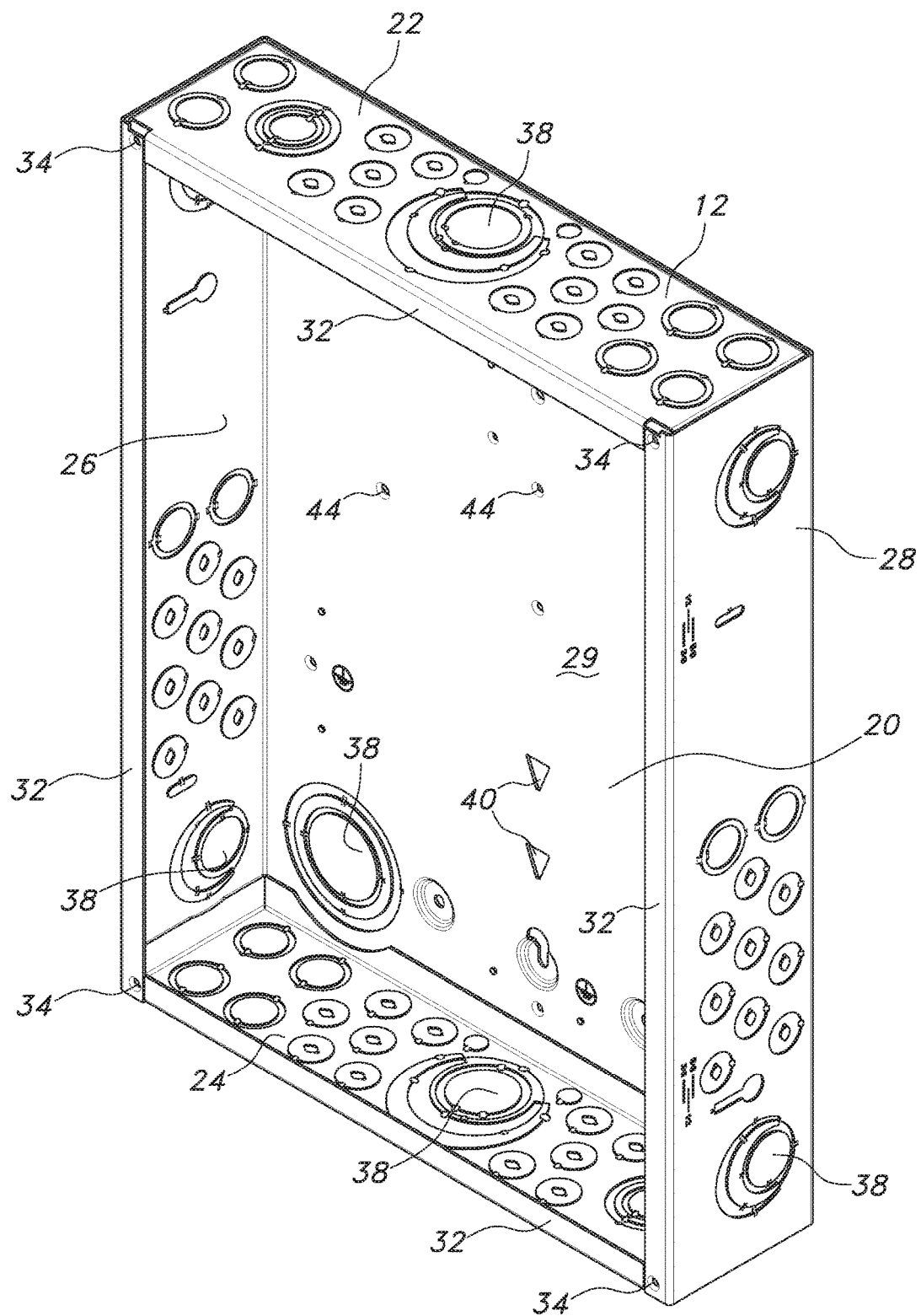
FIG. 3 is a perspective view of the enclosure in FIG. 1.
Figure 4:
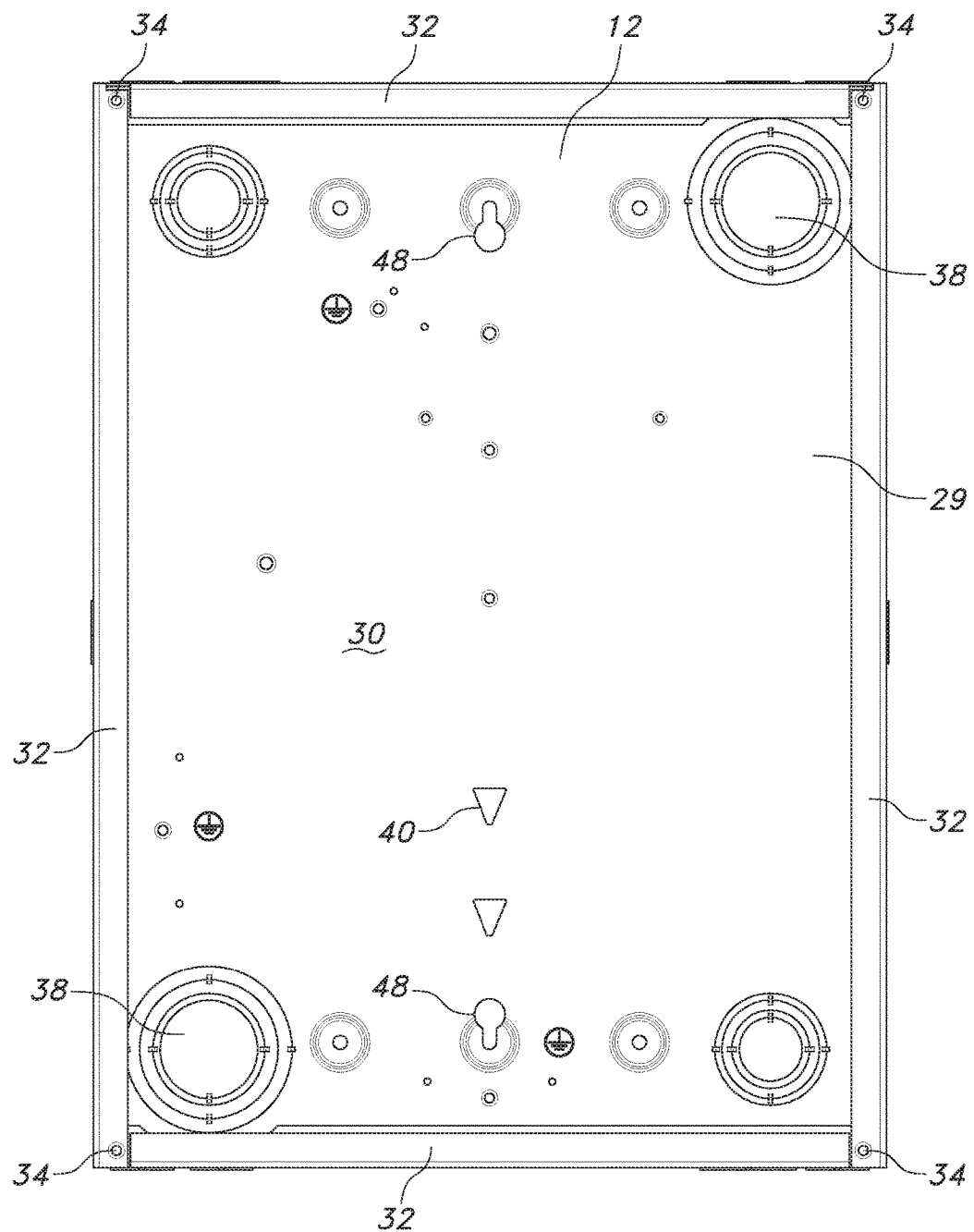
FIG. 4 is a front view of the enclosure in FIG. 3.
Figure 5:
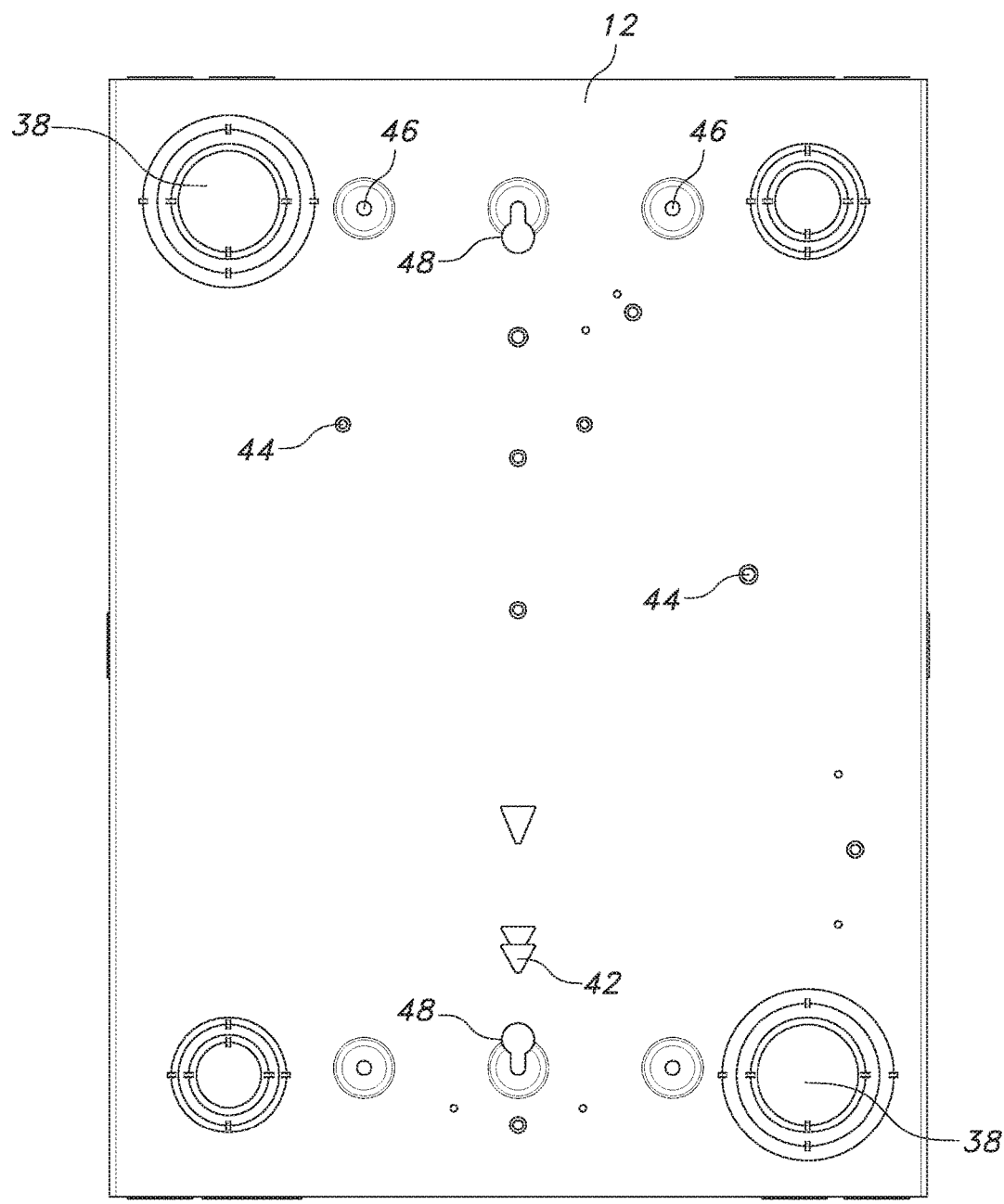
FIG. 5 is a rear view of the enclosure in FIG. 3.

Referring to FIGS. 3-5, there is shown the enclosure 12 to house and protect various interior components such as the panelboard 14 and circuit breakers 18. The enclosure 12 is a generally rectangular shaped (box-like) housing having an open front 20. The enclosure 12 includes opposed top and bottom walls 22, 24, opposed first and second side walls 26, 28, and a back wall 29 extending between the opposed walls 22, 24, 26, 28. Thus, the opposed top and bottom walls 22, 24 are separated by the back wall 29. The opposed first and second side walls 26, 28 are also separated by the back wall 29.

The top and bottom walls 22, 24, and the first and second side walls 26, 28 are integrally connected to the back wall 29 and extend laterally upward therefrom such that the top, bottom, and side walls 22, 24, 26, 28 are substantially perpendicular to the back wall 29. The walls 22, 24, 26, 28, 29 of the enclosure 12 cooperatively define an enclosure volume 30 for holding various interior components.

The enclosure 12 further includes a plurality of inturned members or flanges 32, which are integrally formed from the top, bottom, and side walls 22, 24, 26, 28 of the enclosure 12 such that they are disposed on top of the walls 22, 24, 26, 28, as illustrated in FIG. 4. A plurality of cover mounting holes 34 extend through each inturned member 32 at opposing ends thereof such that they are positioned at each corner of the enclosure 12.

Referring again to FIGS. 3-5, a plurality of knockouts 38 are defined and stamped onto each of the walls 22, 24, 26, 28, 29 of the enclosure 12 to provide a convenient method of creating knockout openings thereon to allow routing of electrical wires not shown to and from the enclosure 12. The plurality of knockouts 38 are constructed as multiple ring knockouts to provide various sizes for the knockout openings on the enclosure 12. The plurality of knockouts 38 may be removed prior to mounting the enclosure 12 to a wall by striking thereon with a tool such as a screwdriver.

The back wall 29 of the enclosure 12 includes a plurality of panelboard mounting apertures 40, through which a panelboard mounting stud 42 of the panelboard 14 is inserted to mount the panelboard 14 to the back wall 29 of the enclosure 12, as illustrated in FIG. 5. The plurality of panelboard mounting apertures 40 and the panelboard mounting stud 42 are dimensioned such that the panelboard mounting stud 42 may be passed freely through each panelboard mounting aperture 40. In addition, a plurality of panelboard mounting holes 44 are defined on the back wall 29 of the enclosure 12, through which a fastener, such as a screw, is inserted to secure the panelboard 14 to the back wall 29 of the enclosure 12.

For mounting the enclosure 12 to a wall, a plurality of enclosure mounting holes 46 and a plurality of keyholes 48 are defined on the back wall 29. The plurality of keyholes 48 allow an easy installation of the load center 10 onto a wall since an installer can preinstall screws in the wall, which can be placed through the larger part of the keyhole to support the weight of the load center 10 while applying the remaining fasteners through the plurality of enclosure mounting holes 46 to secure the enclosure 12 to a wall.

Figure 6:
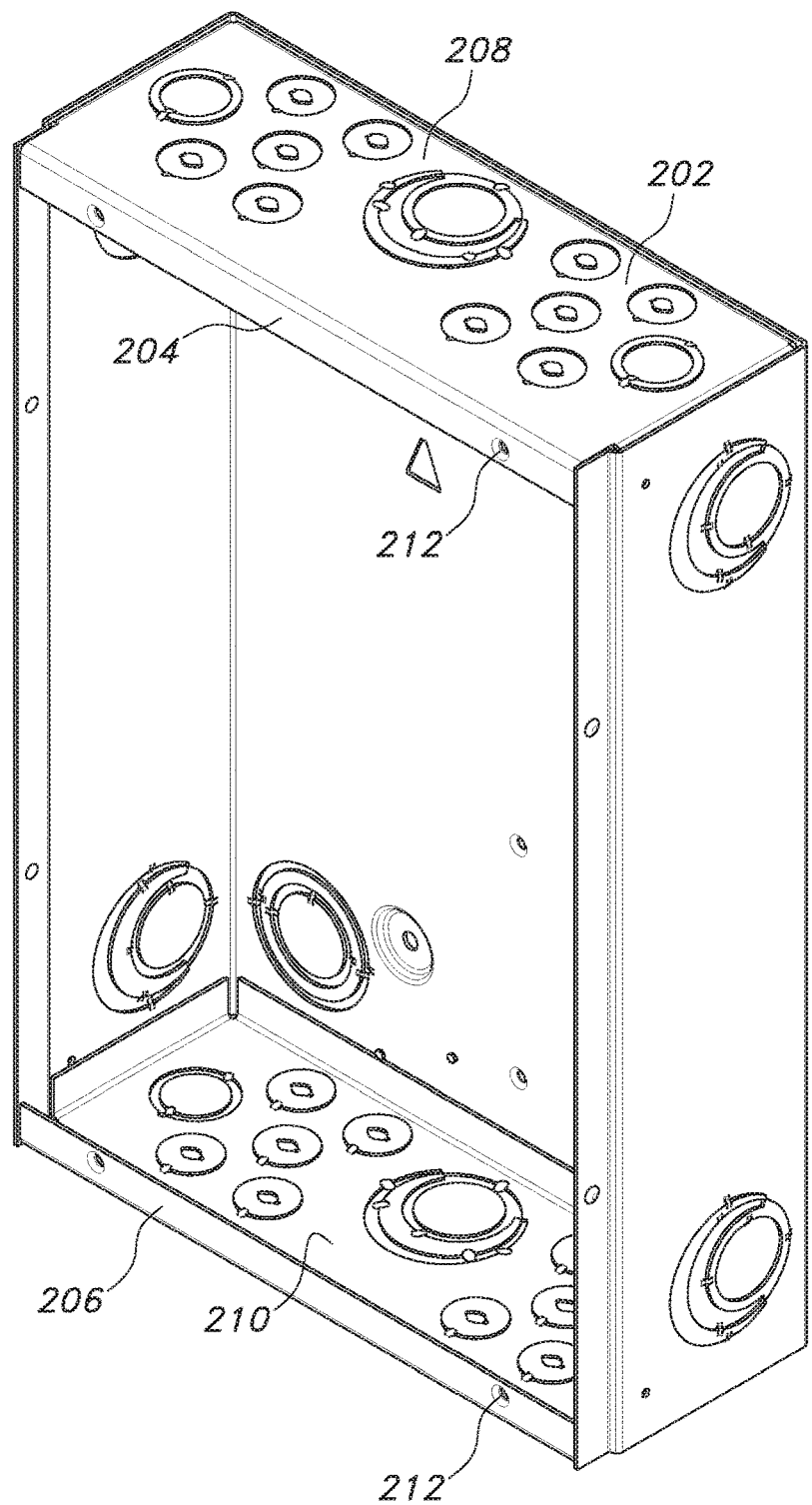
FIG. 6 is a perspective view of an enclosure, according to another embodiment.
Figure 7:
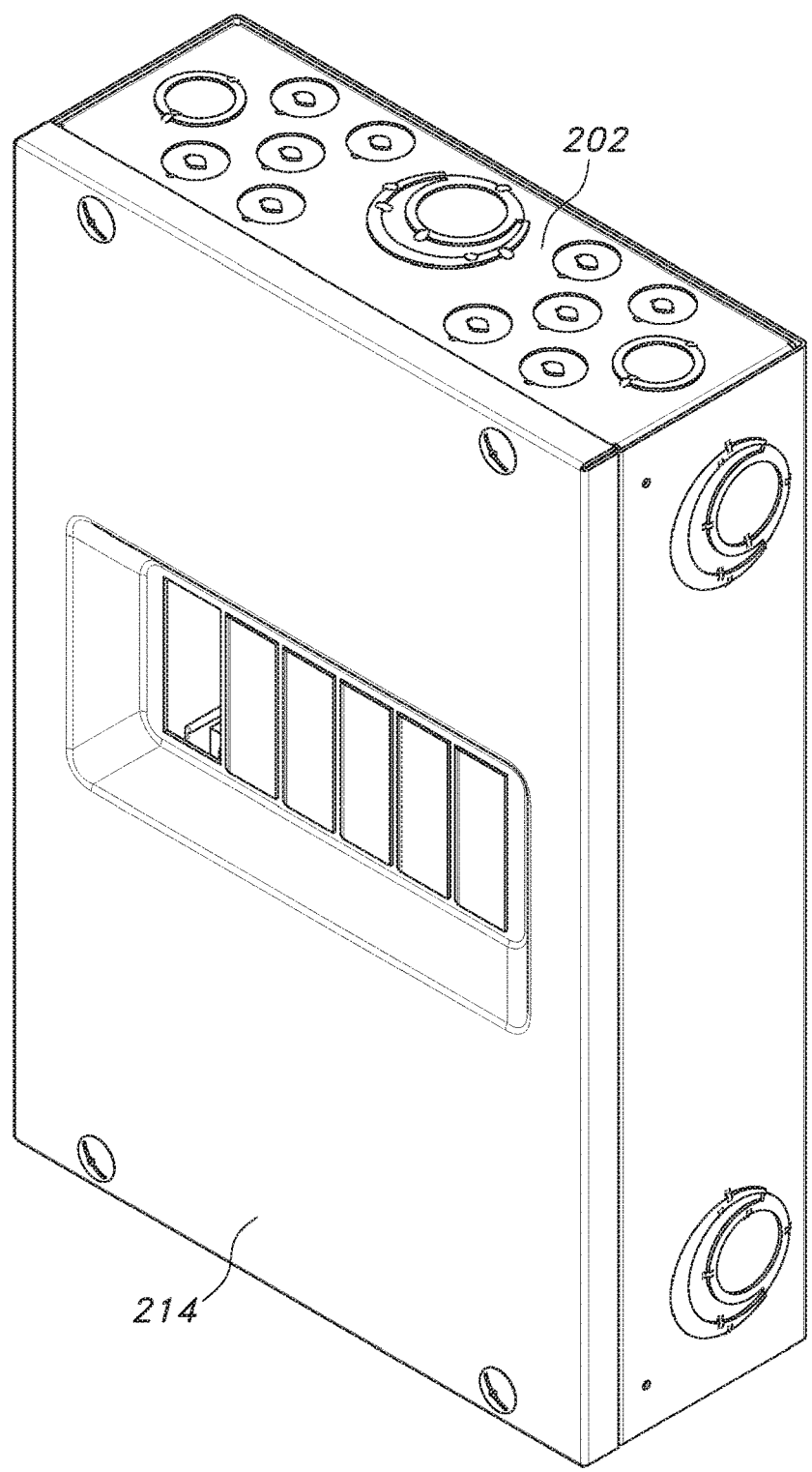
FIG. 7 is a perspective view of an electric load center with a cover adapted to be secured to the enclosure in FIG. 6.

It will be appreciated that other designs and configurations could be used for the enclosure, as deemed suitable for given application factors. For example, referring to FIG. 6, in an alternative embodiment, an enclosure 202 includes inturned members 204, 206 that are integrally formed from top and bottom walls 208, 210 and disposed on top thereof. Each of the inturned members 204, 206 includes a cover mounting hole 212 through which a fastener, such as a screw, is inserted to affix a cover 214 (illustrated in FIG. 7), adapted to enclose an open front of the enclosure 202.

The enclosure 12, 202 is made of one or more materials having suitable properties for a desired application, including strength, weight, rigidity, etc. Steel, such as galvanized steel, is generally preferred.

Figure 8:
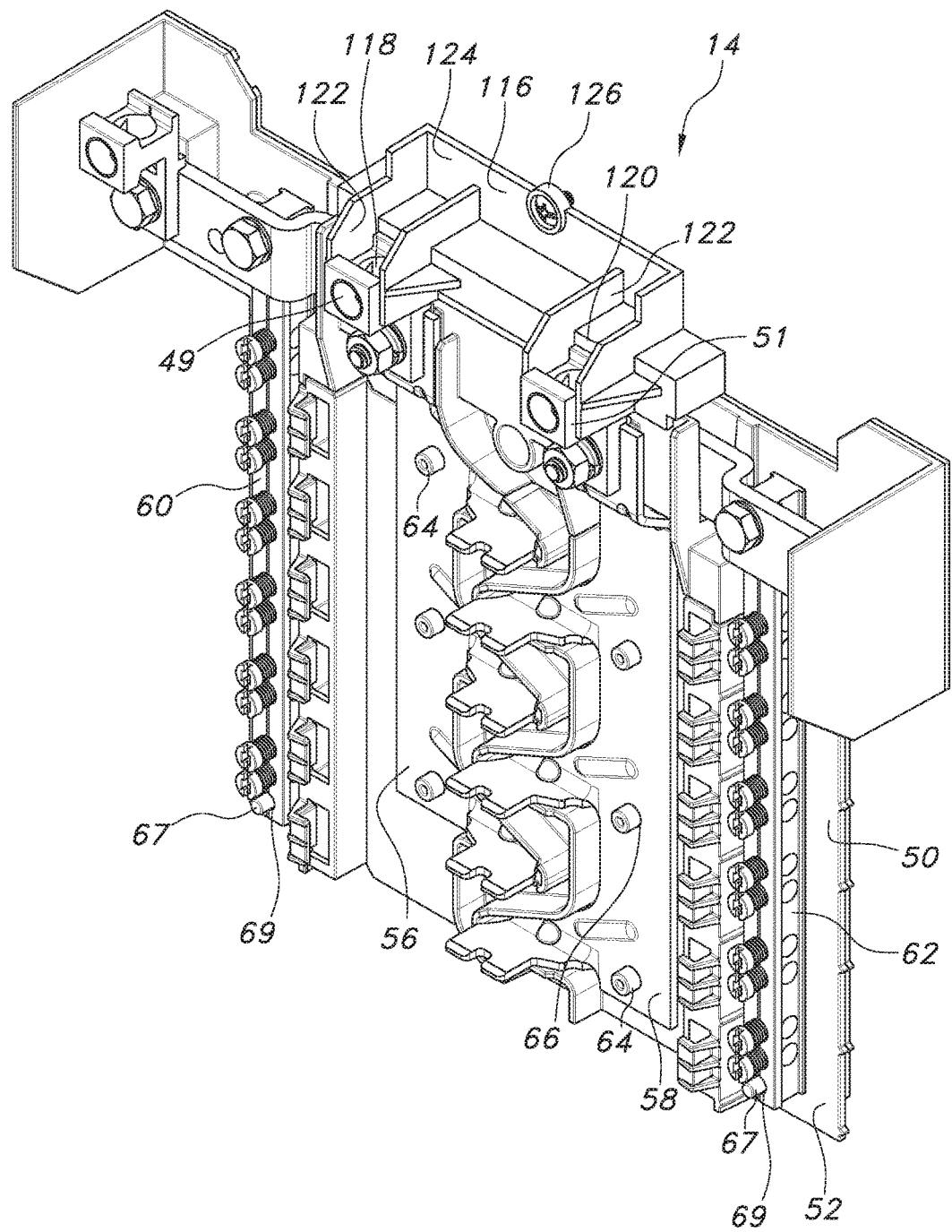
FIG. 8 is a perspective view of the panelboard in FIG. 2, configured to be installed in a vertical orientation.
Figure 9:
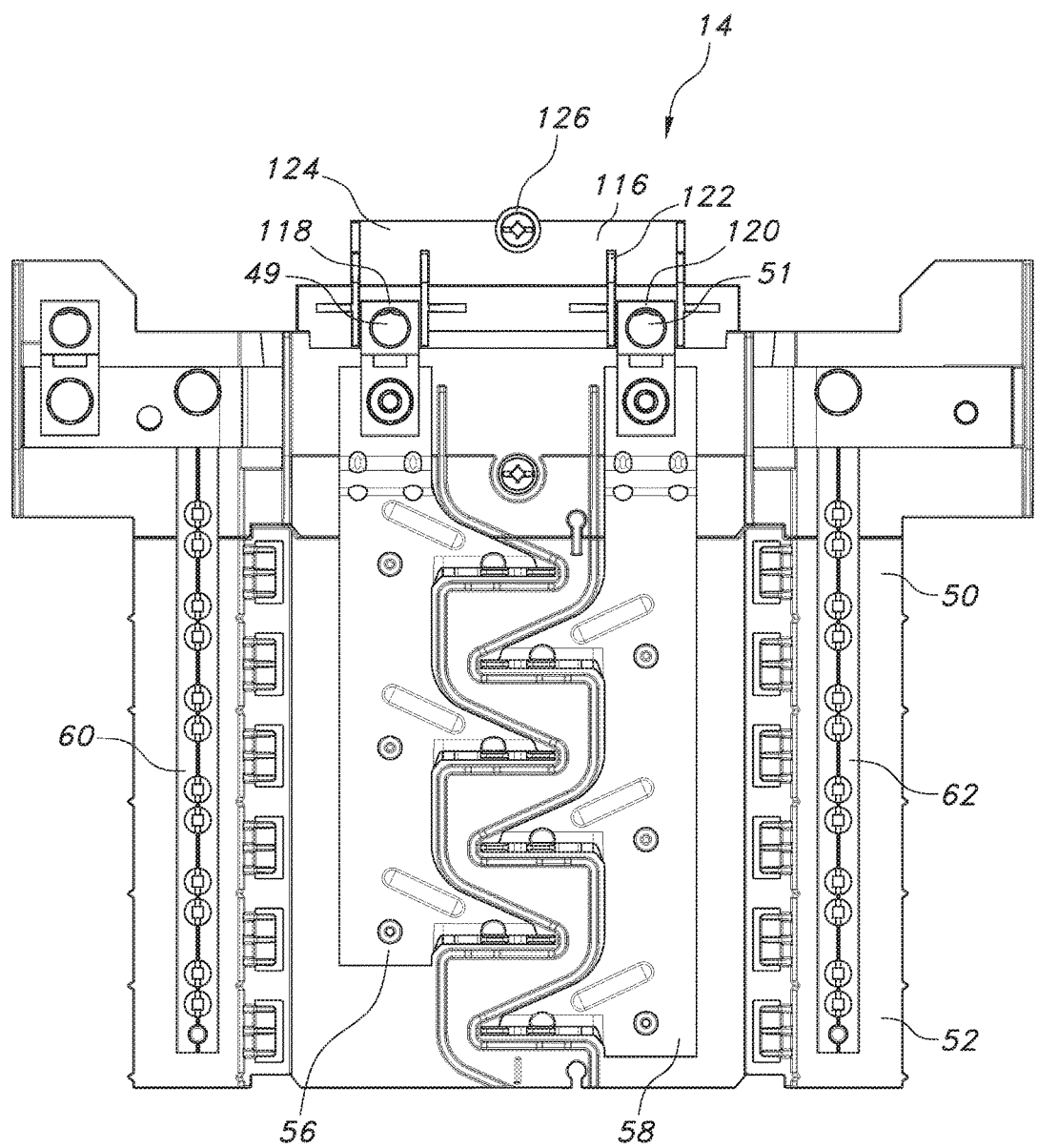
FIG. 9 is a front view of the panelboard in FIG. 8.
Figure 10:
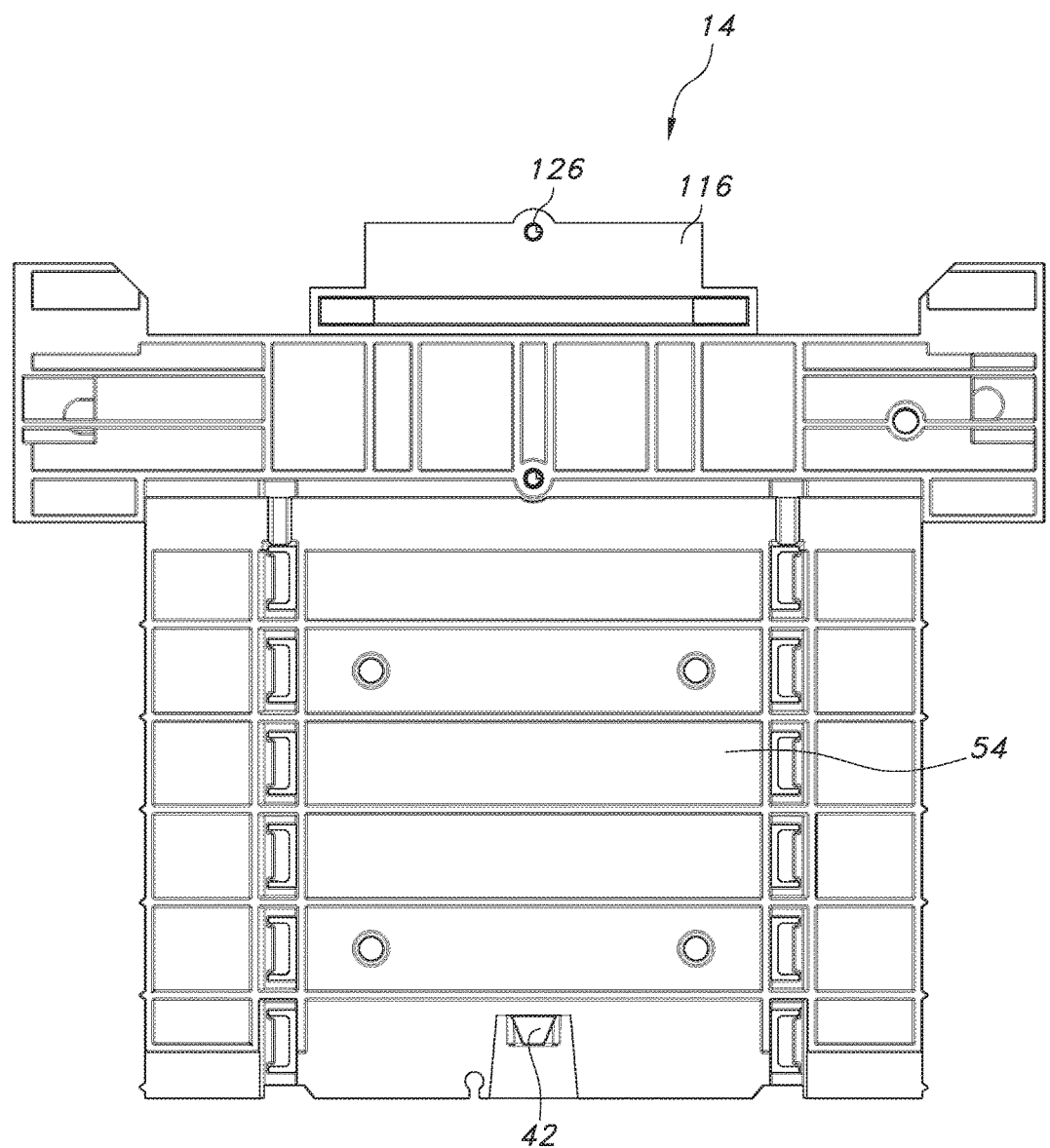
FIG. 10 is a rear view of the panelboard in FIG. 8.

Referring to FIGS. 8-10, in the depicted embodiment, the panelboard 14 is a main lug panelboard for directly connecting incoming electrical cables (not shown) to first and second lugs 49, 51, which are in electrical communication with the first and second bus bars 56, 58, respectively. The panelboard 14 is designed and configured to be installed in a vertical orientation and various types of circuit breakers can be mounted thereon, such as plug-on-neutral circuit breakers, arc fault circuit interrupter (AFCI), etc. These circuit breakers are constructed to be able to mechanically and electrically plug onto the panelboard 14.

The panelboard 14 preferably includes an insulated base 50 having a front surface 52 and a rear surface 54, first and second bus bars 56, 58 adapted to be mounted onto the base 50, and first and second neutral bars 60, 62. The first and second neutral bars 60, 62 are positioned adjacent to the first and second bus bars 56, 58, respectively, such that they are located along the left-hand and right-hand side of the enclosure 12, as shown in FIG. 9.

A plurality of base studs 64 are integrally formed from the base 50 of the panelboard 14, which align with a plurality of bus bar openings 66 defined on each of the bus bars 56, 58 such that the bus bars 56, 58 can be seated and abutted directly on the front surface 52 of the base 50. Once the bus bars 56, 58 are placed onto the base 50 with the plurality of base studs 64 extending through each corresponding bus bar opening 66, the plurality of base studs 64 are deformed using a staking method to secure the bus bars 56, 58 to the panelboard 14 to prevent them from being separated from the panelboard 14. In addition, a plurality of base neutral bar studs 67 are integrally formed from the base 50 of the panelboard 14, which align with a plurality of neutral bar openings 69 defined on each of the neutral bars 60, 62 such that the neutral bars 60, 62 can be seated and abutted directly on the front surface 52 of the base 50. Similar to the bus bars 56, 58, the plurality of base neutral bar studs 67 are deformed using a staking method to secure the neutral bars 60, 62 to the panelboard 14 to prevent them from being separated from the panelboard 14.

As stated above, the panelboard 14 is mounted on the base wall 29 of the enclosure 12 via the panelboard mounting stud 42 and the plurality of panelboard mounting holes 44. Once the panelboard 14 is mounted and disposed within the enclosure 12, the front surface 52 of the base 50 of the panelboard 14 is directed away from the back wall 29 of the enclosure 12, and the rear surface 54 of the base 50 of the panelboard 14 abuts the back wall 29 of the enclosure 12.

Figure 11:
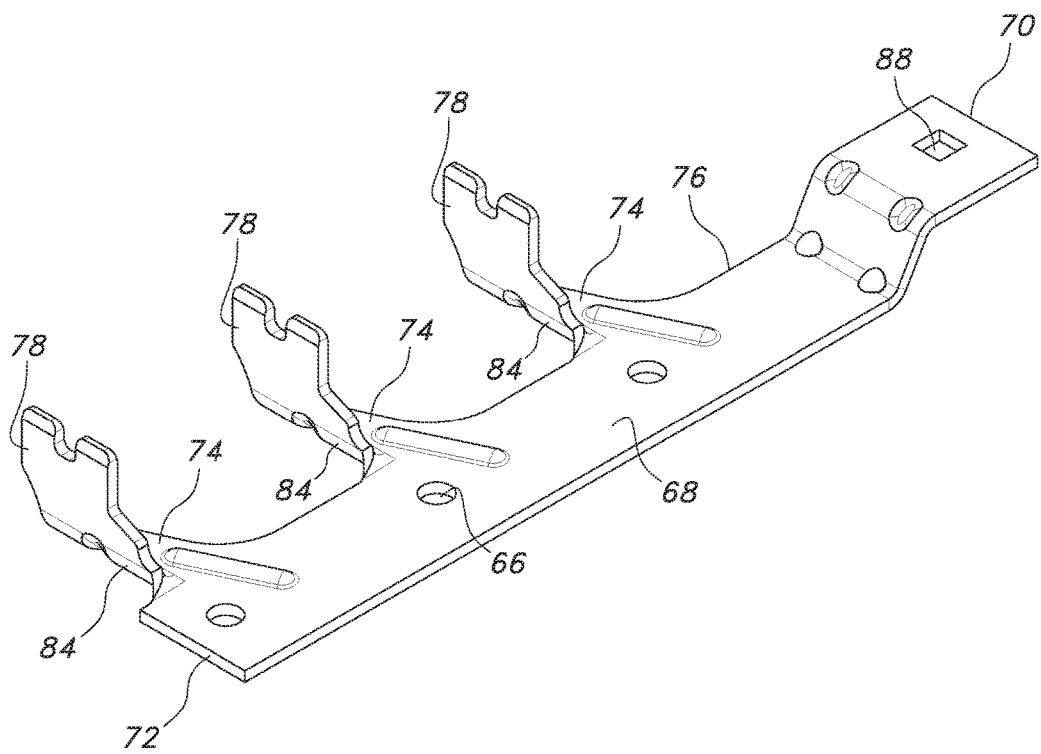
FIG. 11 is a perspective view of the bus bar in FIG. 8.
Figure 12:
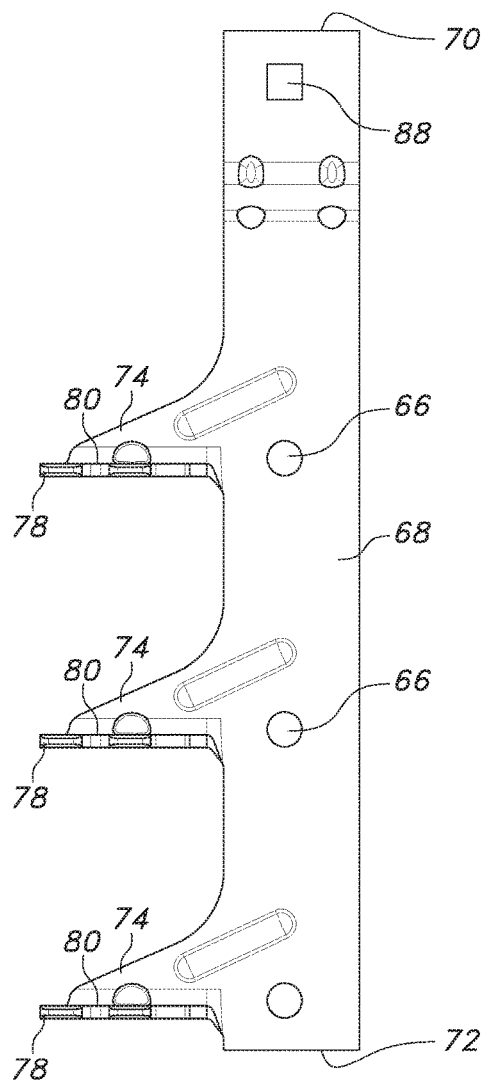
FIG. 12 is a top view of the bus bar in FIG. 8.
Figure 13:
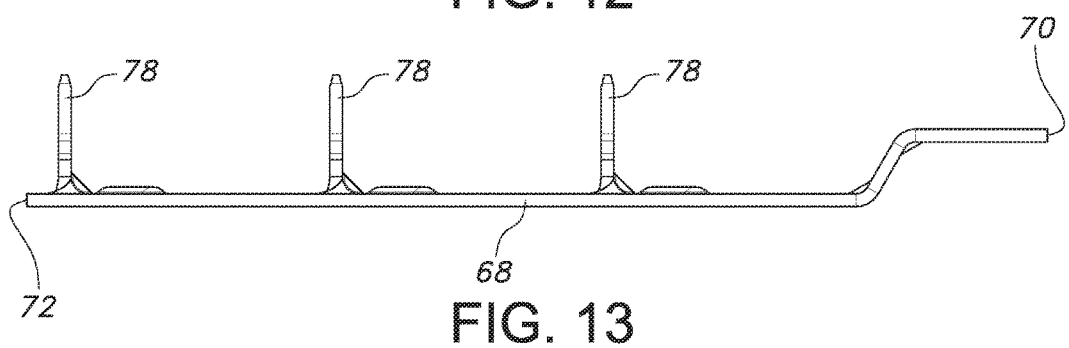
FIG. 13 is a side view of the bus bar in FIG. 8.
Figure 14:
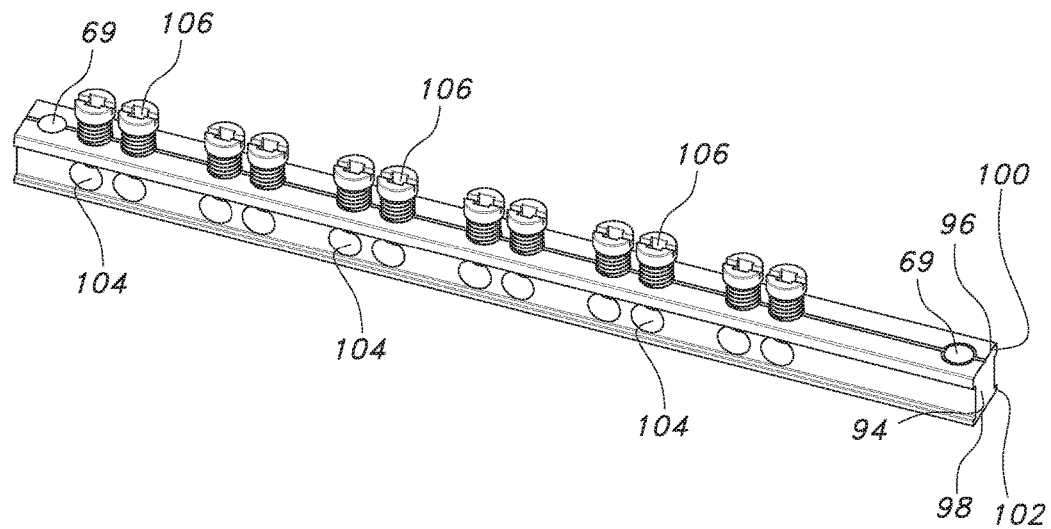
FIG. 14 is a perspective view of the neutral bar in FIG. 2.

Referring to FIGS. 11-13, each of the bus bars 56, 58 is preferably a metallic strip that conducts electricity and serves as a common connection for the circuit breakers 18 to distribute electricity. In the depicted embodiment, the bus bars 56, 58 are arranged to engage with the circuit breakers 18 in vertical rows on left and right sides of the panelboard 14. Each of the bus bars 56, 58 includes an elongated main member 68 extending between top and bottom opposing ends 70, 72 and a plurality of connecting members 74, each of which are integrally formed from the main member 68. Specifically, the plurality of connecting members 74 extend laterally from an edge 76 of the main member 68 and are uniformly spaced apart at a predetermined interval across the entire length of the main member 68. In addition, a plurality of conducting members 78 are integrally formed from a bottom edge 80 of each of the connecting members 74 and extend laterally upward therefrom. Thus, each of the plurality of conducting members 78 is substantially perpendicular to corresponding connecting member 74 and top surface of the main member 68. Each of the conducting members 78 is configured to engage with the circuit breaker 18, such that it connects the circuit breaker 18 to the current carrying bus bar.

A lower portion of each of the plurality of conducting members 78 is integrally connected to the main member 68 via a connecting portion 84, which is deformed and stretched when the conducting members 78 are formed by bending, as shown in FIG. 11. The integrally formed bent, stretched and deformed connecting portion 84 optimizes the cross-section between the conducting member 78 and the main member 68, thereby increasing the current carrying capacity during engagement with the circuit breaker 18. In addition, the bent and deformed connecting portion 84 prevents electrical creepage between current-carrying parts and also prevents heat generated from the bus bars 56, 58. Additionally, the connecting members 74 of the bus bar 56, 58 are a continuous wedge shape without any recesses or cutouts which have been used in the past. By providing a continuous connecting member 74, a weak area subject to overheating and potential failure is avoided and optimized connect flow is achieved. Thus, the transition from the main member 68 to the connecting portion 84 provides maximum current carrying capacity by maintaining the integrity of the current carrying material.

The plurality of bus bar openings 66 are defined on each of the bus bars 56, 58, as described above, and are uniformly spaced apart at a predetermined interval across the entire length of the main member 68 of each of the bus bars 56, 58. Each of the bus bars 56, 58 further includes a lug connecting aperture 88 defined at the top end 70 thereof, through which a fastener is inserted to mechanically and electrically connect the first and second lugs 49, 51 to the first and second bus bars 56, 58, respectively, to distribute electricity, as shown in FIG. 9.

Referring to FIGS. 14-17, the neutral bars 60, 62 are designed and configured to optimize engagement with a neutral clip 90 of the circuit breaker 18. Each of the neutral bars 60, 62 is elongated and substantially I-shaped, and includes a generally vertical main body 94 having first and second ends 96, 98, and transverse upper and lower members 100, 102 integrally connected and separated by the main body 94. The transverse upper and lower members 100, 102 are disposed at first and second ends 96, 98 of the main body 94, respectively, and are substantially perpendicular to the main body 94. Each of the neutral bars 60, 62 includes a plurality of neutral bar apertures 104 and matching neutral bar connecting screws 106 along the entire length of each of the neutral bars 60, 62.

Figure 15:
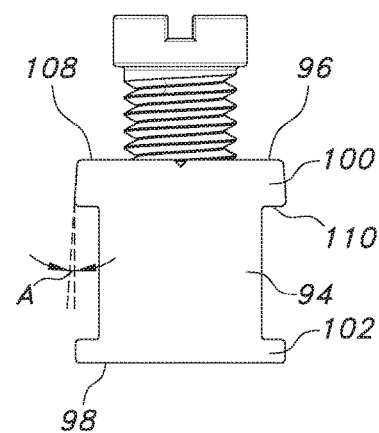
FIG. 15 is a cross-sectional view of the neutral bar in FIG. 14.
Figure 16:
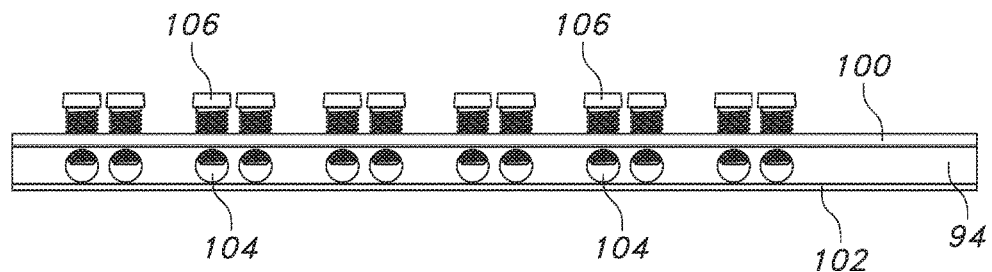
FIG. 16 is a side view of the neutral bar in FIG. 14.
Figure 17:
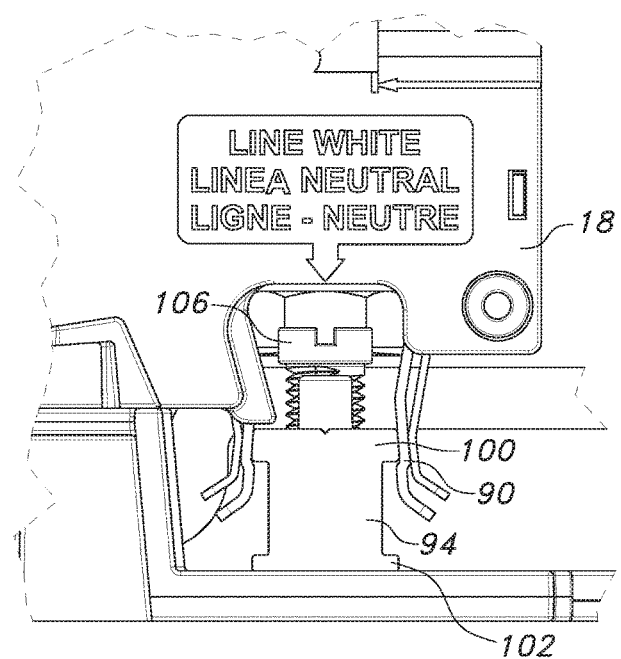
FIG. 17 is a front view of the neutral bar in FIG. 14, with a neutral clip of a circuit breaker engaged therewith.

As can be seen from FIG. 15, the transverse upper member 100 of each of the neutral bars 60, 62 is thicker than the transverse lower member 102 of each of the neutral bars 60, 62. This design of the transverse upper member 100 provides a greater contact area for engagement of the neutral bar 60, 62 with a breaker neutral clip 90 to enhance current carrying capacity. In addition, the upper transverse member 100 of the neutral bar 60, 62 includes an outward taper from a top surface 108 of the transverse upper member 100 to a bottom surface 110 of the transverse upper member 100 at an angle A, preferably 4 degrees with respect to the y-axis, to allow the neutral clip 90 of the circuit breaker 18 to exert greater clamping forces against the transverse upper member 100, as shown in FIG. 17.

In the present disclosure, the bus bar 56, 58 and the neutral bar 60, 62 are designed and configured such that the circuit breaker 18 can be mechanically plugged onto or pulled off from the bus bar 56, 58 and the neutral bar 60, 62 by movement in one linear axial direction, i.e., perpendicular to the base 50 of the panelboard 14. For example, the circuit breaker 18 may be mounted on the panelboard 14 by pushing opposing sides of the circuit breaker 18 simultaneously, causing a connector (not shown) of the circuit breaker 18 to engage with the conducting member 78 of the bus bar 56, 58 and the neutral clip 90 of the circuit breaker 18 to engage with the transverse upper member 100 of the neutral bar 56, 58. Once mounted on the panelboard 14, the circuit breaker 18 may be separated therefrom by pulling the circuit breaker 18 from opposing sides thereof simultaneously, causing the circuit breaker 18 to disengage from the bus bar 56, 58 and the neutral bar 60, 62.

Referring again to FIGS. 8 and 9, the panelboard 14 further includes a lug stabilizer 116, which is disposed around the first and second lugs 49, 51 to stabilize and prevent rotation of the lugs 49, 51. Specifically, the lug stabilizer 116 is an integrally formed bridge which is installed immediately above the top edge of the base 50 of the panelboard 14 such that the first and second lugs 49, 51 are closely accommodated within first and second grooves 118, 120 of the lug stabilizer 116. The grooves 118, 120 are formed by a plurality of lug stabilizer walls 122 extending perpendicularly upward from a base 124 of the lug stabilizer 116. A lug stabilizer mounting hole 126 is defined on the base 124 of the lug stabilizer 116, through which a fastener, such as a screw, rivet, or nail, could be inserted to secure the lug stabilizer 116 to the base wall 29 of the enclosure 12.

Figure 18:
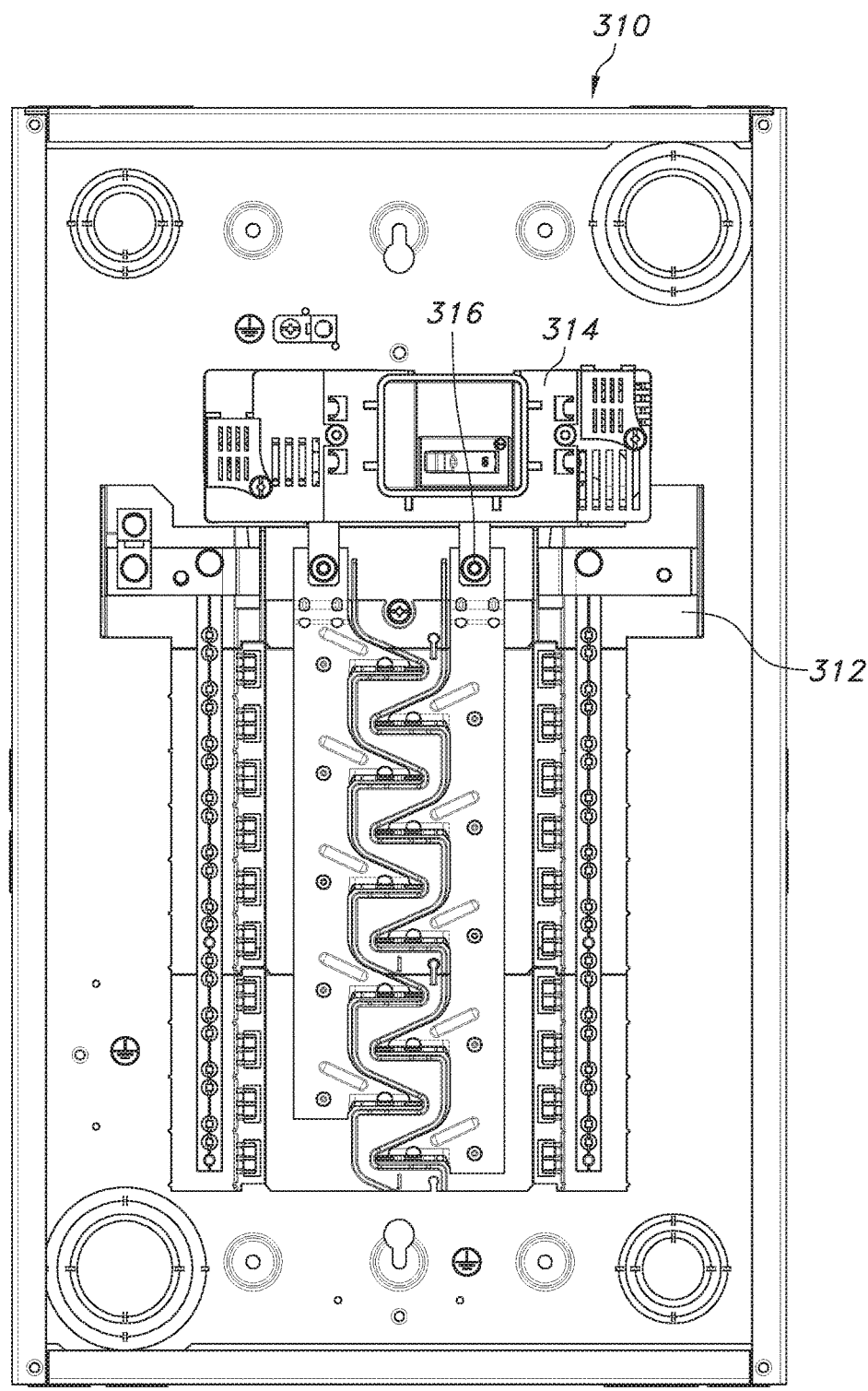
FIG. 18 is a front view of a panelboard with a main breaker installed in the enclosure in FIG. 3.

Referring to FIG. 18, in an alternate embodiment, a load center 310 includes a panelboard 312 with a main breaker 314. The main breaker 314 provides a means to manually disconnect power from the load center 310 and overcurrent protection. In the load center 310, incoming electricity supply cables (not shown) are connected to lugs 316 located below the main breaker 314.

Figure 19:
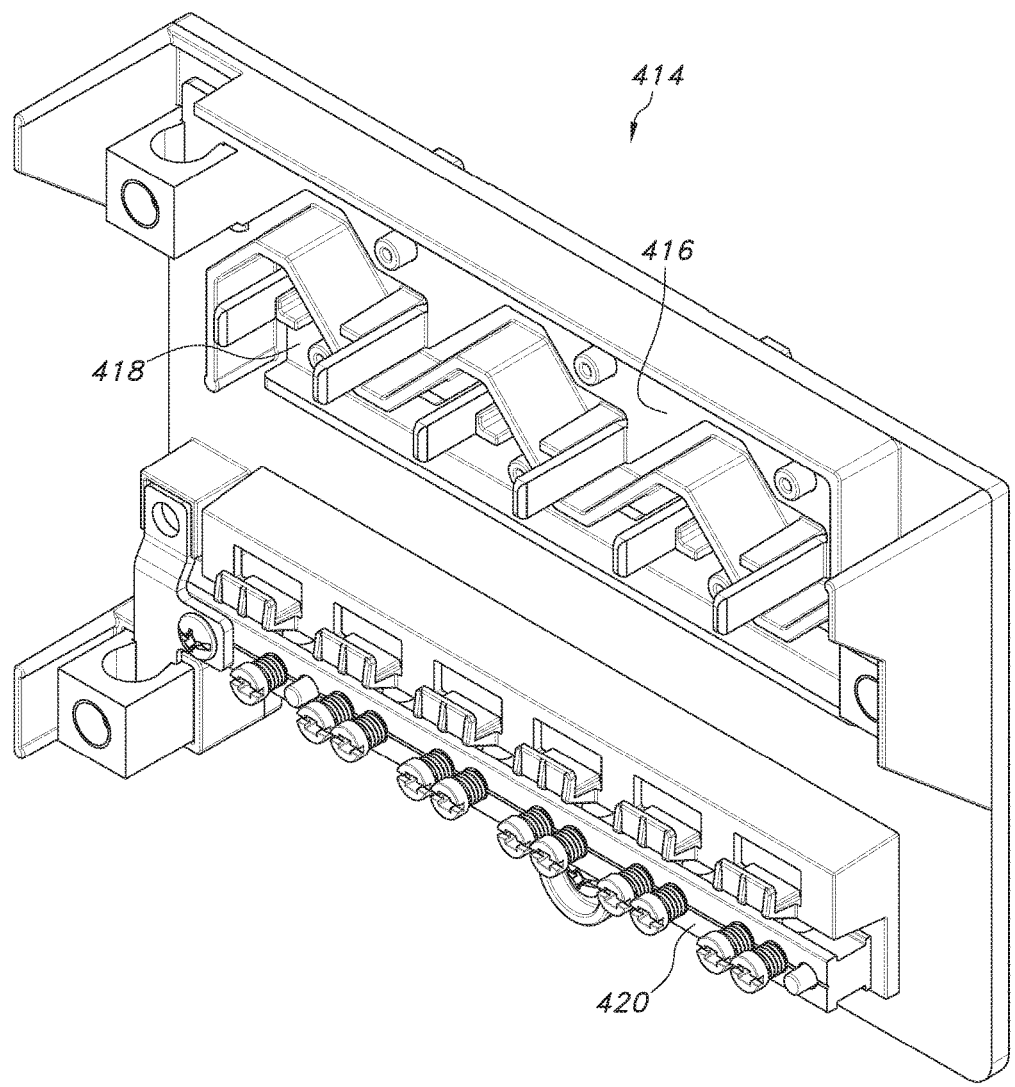
FIG. 19 is a perspective view of a panelboard, according to another embodiment, configured to be installed in a horizontal orientation.

Referring to FIG. 19, in an alternate embodiment, the panelboard 414 is designed and configured to be installed in a horizontal orientation. In the depicted embodiment, bus bars 416, 418 and a neutral bar 420 are arranged along a top portion of the panelboard 414 and a bottom portion of the panelboard 414, respectively, to engage with circuit breakers in a horizontal row. The bus bars 416, 418 and the neutral bar 420 are identical to the bus bars 56, 58 and the neutral bars 60, 62 described in the previous embodiment where the panelboard 14 is configured to be installed in a vertical orientation.

The bus bars 56, 58, 416, 418 and neutral bars 60, 62, 420 are made of one or more materials having suitable properties for a desired application, including strength, weight, rigidity, etc. Preferably, each of the bus bars 56, 58, 416, 418 is made out of an electrically conductive material, such as aluminum. In addition, each of the bus bars 56, 58, 416, 418 may be constructed with a single sheet of metal, which can be cut, bent, stretched and deformed to make the shape illustrated in FIG. 11.

Figure 20:
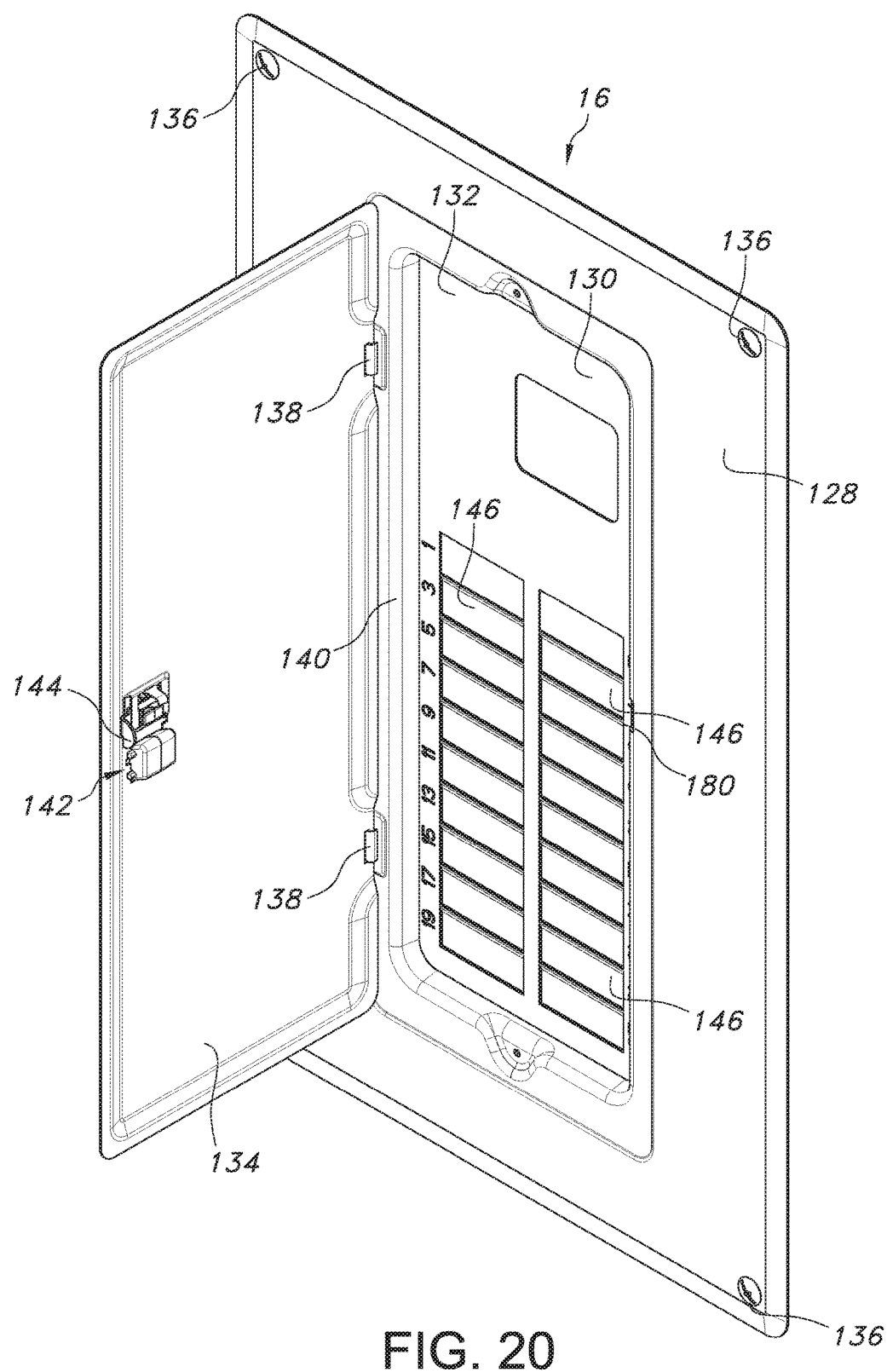
FIG. 20 is a perspective view of the cover assembly in FIG. 1.

Referring to FIG. 20, the cover assembly 16 is configured to be mounted over the open front 20 of the enclosure 12 to cover and protect interior components disposed within the enclosure 12. The cover assembly 16 also provides an access to each of the circuit breakers 18 installed within the enclosure 12.

The cover assembly 16 includes a trim panel 128 having a door aperture 130, a recessed portion 132 coupled to the trim panel 128, and a door 134 hingedly connected to the trim panel 128. The cover assembly 16 is attached to the enclosure 12 from the open front 20 thereof with fasteners, such as screws. Specifically, the trim panel 128 is placed over the open front 20 of the enclosure 12 such that the plurality of cover mounting holes 34 of the inturned members or flanges 32 align with a plurality of trim panel holes 136 that are defined on the trim panel 128. Thereafter, fasteners are inserted through the aligned holes 34, 136 to affix the trim panel 128 onto the enclosure 12.

The door 134 is connected to the trim panel 128 with a plurality of hinges 138 located along the left edge 140 of the door aperture 130 and is repositionable relative thereto between open (FIG. 1) and closed (FIG. 21) positions. The door 134 secures the enclosure 12 via a lockable access latch 142 installed thereon, which will be described in greater detail below. A latch aperture 144 is provided on the door 134, through which the latch 142 may be mounted to provide a locking mechanism for the load center 10. A plurality of circuit breaker knockouts 146 are defined on the recessed portion 132 to provide a convenient method of creating knockout openings thereon for accessing the installed circuit breakers 18.

Figure 22:
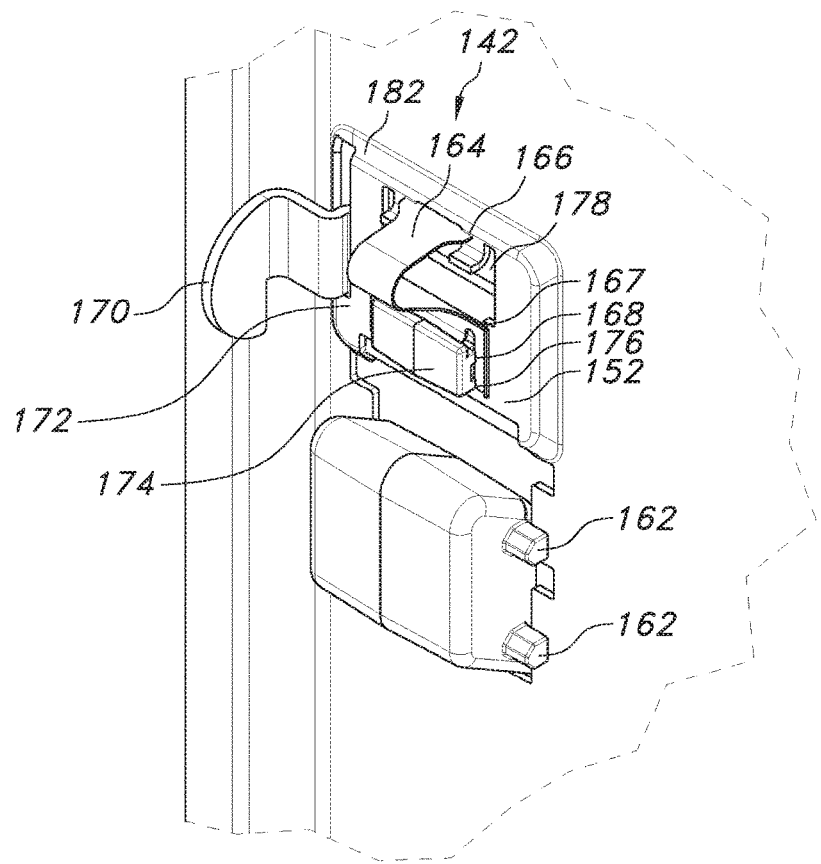
FIG. 22 is a partial view of the door in FIG. 20, with a latch mounted thereon.
Figure 23:
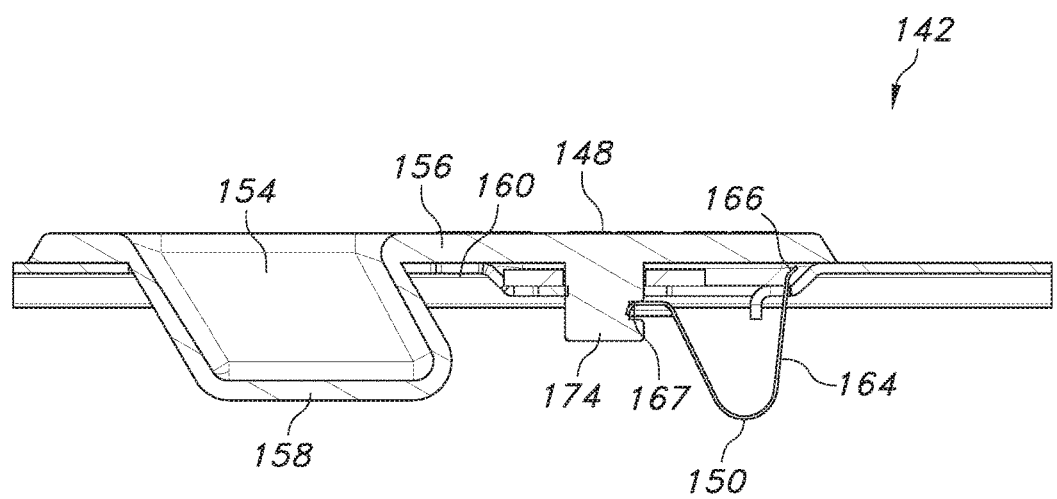
FIG. 23 is a cross-sectional view of the latch in FIG. 22.

Referring to FIGS. 22 and 23, the latch 142 is a three-part structure, which includes a handle 148, a spring 150, and a lock 152 integrally formed from the door 134 of the cover assembly 16. A latch recess 154 is defined on a handle top member 156 such that user's fingers could be inserted thereinto to slide the latch 142 to open/close the door 134. A handle body member 158 is integrally formed from a bottom surface 160 of the handle top member 156 and extends outwardly therefrom with an angle. A plurality of projections 162 are integrally formed and extend outwardly from top and bottom portions of each opposing side of the handle body member 158, thereby creating a latch slot between the handle top member 156 and each of the plurality of latch projections 162.

The spring 150 includes a tongue 164 and a spring body member 168. The tongue 164 is generally u-shaped and acts as a biasing means. The tongue 164 has a free end 166 and a connected end 167 that is integrally connected to the spring body member 168. The lock 152 includes a hook 170 and a lock body member 172.

To connect the spring 150, lock 152, and handle 148, a latch connector 174 is integrally formed from the bottom surface 160 of the handle top member 156 and extends outwardly therefrom. The latch connector 174 is configured such that the spring 150 and the lock 152 can be tightly engaged therewith. Specifically, the spring body member 168 and the lock body member 172 define a spring aperture 176 and a lock aperture 178, respectively, through which the latch connector 174 can be tightly inserted and connect with both the spring 150 and the lock 152, as illustrated in FIG. 22.

Figure 21:
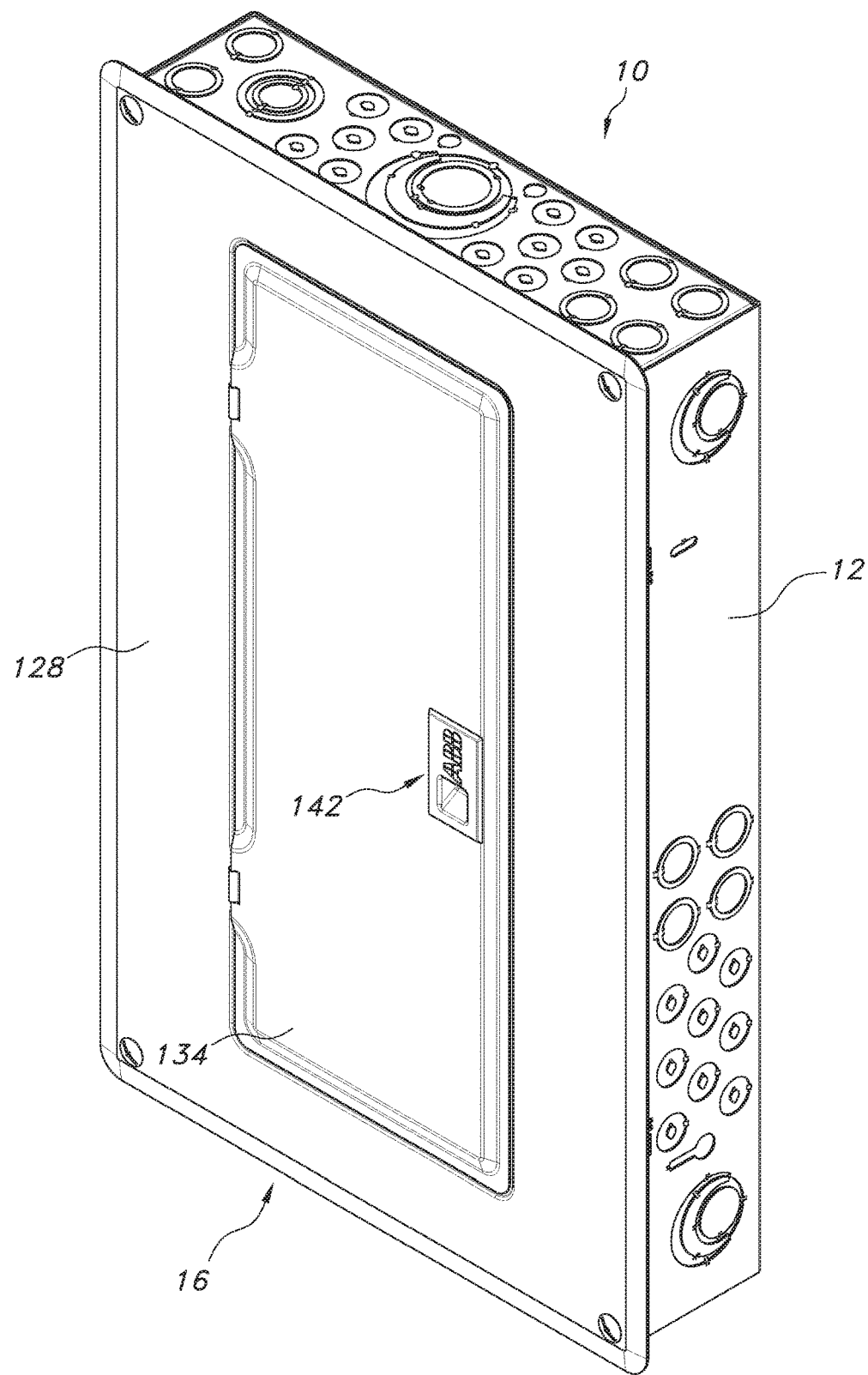
FIG. 21 is a perspective view of the electric load center in FIG. 1, with the cover assembly in a closed position.

When the door is in the closed position, as illustrated in FIG. 21, the hook 170 aligns with a hook hole 180 defined in the trim panel 128 (as shown in FIG. 20) such that the hook 170 is inserted thereinto and engages with the trim panel 128 to keep the door 134 closed. In addition, the free end 166 of the spring 150 of the latch 142 presses against a top flange 182 integrally formed on the lock body member 172, and each of edges of the latch aperture 144 is placed within each corresponding latch slot 164. To open the door 134, the user inserts his/her fingers into the latch recess 154 and slides the latch 142 under spring pressure to allow the door 134 to be opened. Specifically, as the latch 142 is pressed and slid, the hook 170 is disengaged with the hook hole 180 and passes therethrough, thereby allowing the latch 142 to move upwardly.

The latch 142 is dimensioned to be closely engaged within the latch aperture 144. The hook 170 is dimensioned to be closely engaged with the hook hole 180 to provide a locking mechanism for the door 134.

The latch 142 is made of one or more materials having suitable properties for a desired application, including strength, weight, rigidity, etc. Steel is generally preferred for the spring 150 and the lock 152 of the latch 142. Plastic is generally preferred for the handle 148 of the latch 142.

From the foregoing, it will be appreciated that an electrical load center according to the present invention includes improved interior components, while providing electrical circuit control and overcurrent protection.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. An electric load center comprising:
   an enclosure having an open front;
   a cover assembly configured to be installed over the open front of the enclosure; and
   a panelboard adapted to be installed within the enclosure, the panelboard including:
      an insulated base; and
      first and second bus bars, each of the first and second bus bars having an elongated main member, a plurality of connecting members, each of which is integrally formed from an edge of the main member with a continuous wedge shape without any recess or cutouts, and a plurality of conducting members integrally formed from a bottom edge of each of the connecting members,
   wherein the plurality of conducting members of the bus bars are configured such that they allow a circuit breaker to be mechanically plugged onto or pulled off from the bus bars by movement in one linear axial direction substantially perpendicular to a base of the panelboard.

2. The electric load center of claim 1, wherein the panelboard further includes at least one neutral bar having a generally vertical main body, and transverse upper and lower members integrally connected and separated by the main body, and wherein the transverse upper member has an outward taper from a top surface of the transverse upper member to a bottom surface of the transverse upper member.

3. The electric load center of claim 2, wherein the transverse upper member is thicker than the transverse lower member.

4. The electric load center of claim 2, wherein the circuit breaker is mounted onto the panelboard by pushing opposing sides of the circuit breaker simultaneously, causing a connector of the circuit breaker to engage with the bus bar and a neutral clip of the circuit breaker to engage with the tapered transverse upper member of the neutral bar.

5. The electric load center of claim 2, wherein the circuit breaker is separated from the panelboard by pulling the circuit breaker from opposing sides simultaneously, causing the circuit breaker to disengage from the bus bar and the neutral bar.

6. The electric load center of claim 2, wherein the transverse upper member is configured to provide a contact area for engagement of the neutral bar with a neutral clip of the circuit breaker to enhance current carrying capacity.

7. The electric load center of claim 2, wherein the transverse upper and lower members are substantially perpendicular to the main body of the neutral bar.

8. A bus bar configured to be mounted on a panelboard of an electrical load center, the bus bar comprising:
   an elongated main member extending between opposed first and second ends;
   a plurality of connecting members, each of the plurality of connecting members integrally formed from an edge of the main member and includes a continuous wedge shape without any recesses or cutouts; and a plurality of conducting members extending upwardly from a bottom edge of each of the plurality of connecting members, wherein each of the plurality of conducting members is integrally connected to the main member via a connecting portion, which is deformed and stretched when the conducting members are formed by bending.

9. The bus bar of claim 8, wherein the plurality of connecting members extend laterally from the edge of the main member.

10. The bus bar of claim 8, wherein the plurality of connecting members are uniformly spaced apart at a predetermined interval across an entire length of the main member.

11. The bus bar of claim 8, wherein each of the plurality of conducting members is substantially perpendicular to the corresponding connecting member and a top surface of the main member.

12. The bus bar of claim 8, wherein the connecting portion optimizes a cross-section between the conducting member and the main member, thereby increasing current carrying capacity during an engagement with a circuit breaker.

13. The bus bar of claim 8, wherein the connecting portion prevents electrical creepage between current-carrying parts and also prevents heat generated from the bus bar.

14. The bus bar of claim 8, wherein the continuous wedge shape without any recesses or cutouts of each of the plurality of connecting members optimizes current flow and prevents overheating and potential failure of the bus bar.

* * * * *